US011374232B2

(12) United States Patent
Patel et al.

(10) Patent No.: US 11,374,232 B2
(45) Date of Patent: Jun. 28, 2022

(54) DIELECTRIC SEPARATOR FOR FUEL CELL STACK ASSEMBLY AND MANUFACTURING METHOD THEREOF

(71) Applicant: BLOOM ENERGY CORPORATION, San Jose, CA (US)

(72) Inventors: Siddharth Patel, Menlo Park, CA (US); Michael Petrucha, Santa Clara, CA (US); Adrian Basharain, San Leandro, CA (US); Victor Fung, Daly City, CA (US); Martin Perry, Mountain View, CA (US); Emad El Batawi, Sunnyvale, CA (US); David Edmonston, Soquel, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/244,098

(22) Filed: Apr. 29, 2021

(65) Prior Publication Data

US 2021/0351420 A1    Nov. 11, 2021

Related U.S. Application Data

(60) Provisional application No. 63/020,074, filed on May 5, 2020.

(51) Int. Cl.
*H01M 8/0236* (2016.01)
*H01M 8/0245* (2016.01)
*H01M 8/24* (2016.01)

(52) U.S. Cl.
CPC ....... *H01M 8/0236* (2013.01); *H01M 8/0245* (2013.01); *H01M 8/24* (2013.01)

(58) Field of Classification Search
None
See application file for complete search history.

(56) References Cited

U.S. PATENT DOCUMENTS

2001/0046619 A1   11/2001   Mien
2002/0164514 A1   11/2002   Kelley et al.
(Continued)

OTHER PUBLICATIONS

Notification of Transmittal of the International Search Report and the Written Opinion of the International Searching Authority for International Patent Application No. PCT/US2021/029824, dated Aug. 20, 2021, 10 pages.

*Primary Examiner* — Alix E Eggerding
(74) *Attorney, Agent, or Firm* — The Marbury Law Group PLLC

(57) ABSTRACT

A fuel cell column includes first and second fuel cell stacks, a fuel manifold disposed between the first and second fuel cell stacks and configured to provide fuel to the first and second fuel cell stacks, and first and second dielectric separators located between the fuel manifold and the respective first and second fuel cell stacks, and configured to electrically isolate the respective first and second fuel cell stacks from the fuel manifold. The first and second dielectric separators each include a top layer of a ceramic material, a bottom layer of the ceramic material, a middle layer disposed between the top and bottom layers and including a material having a lower density and a higher dielectric strength than the ceramic material, and glass or glass ceramic seals which connect the middle layer to the top and bottom layers.

20 Claims, 9 Drawing Sheets

(56) References Cited

U.S. PATENT DOCUMENTS

| | | |
|---|---|---|
| 2006/0141324 A1 | 6/2006 | Kelley et al. |
| 2007/0196704 A1 | 8/2007 | Valensa et al. |
| 2013/0078398 A1 | 3/2013 | Weber |
| 2016/0226093 A1* | 8/2016 | Edmonston ........ H01M 8/04298 |
| 2019/0051923 A1* | 2/2019 | Ashary ............... H01M 8/1246 |
| 2019/0109345 A1 | 4/2019 | Edmonston et al. |
| 2020/0381762 A1 | 12/2020 | Edmonston et al. |

* cited by examiner

DIELECTRIC SEPARATOR FOR FUEL CELL STACK ASSEMBLY AND MANUFACTURING METHOD THEREOF

FIELD

The present disclosure is directed to fuel cell systems in general and to dielectric separators for a fuel cell stack assembly in particular.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

SUMMARY

According to various embodiments of the present disclosure, a fuel cell column includes first and second fuel cell stacks, a fuel manifold disposed between the first and second fuel cell stacks and configured to provide fuel to the first and second fuel cell stacks, and first and second dielectric separators located between the fuel manifold and the respective first and second fuel cell stacks, and configured to electrically isolate the respective first and second fuel cell stacks from the fuel manifold. The first and second dielectric separators each include a top layer of a ceramic material, a bottom layer of the ceramic material, a middle layer disposed between the top and bottom layers and including a material having a lower density and a higher dielectric strength than the ceramic material, and glass or glass ceramic seals which connect the middle layer to the top and bottom layers.

According to another embodiment, a fuel cell column comprises first and second fuel cell stacks, a fuel manifold disposed between the first and second fuel cell stacks and configured to provide fuel to the first and second fuel cell stacks, and first and second dielectric separators located between the fuel manifold and the respective first and second fuel cell stacks, and configured to electrically isolate the respective first and second fuel cell stacks from the fuel manifold, the first and second dielectric separators each comprising a peripheral frame, internal supports disposed inside of the frame and configured to support the peripheral frame, and fuel holes and internal openings at least partially defined by the peripheral frame and internal supports.

According to another embodiment, a fuel cell column includes first and second fuel cell stacks, a fuel manifold disposed between the first and second fuel cell stacks and configured to provide fuel to the first and second fuel cell stacks, and first and second dielectric separators located between the fuel manifold and the respective first and second fuel cell stacks, and configured to electrically isolate the respective first and second fuel cell stacks from the fuel manifold. The first and second dielectric separators each include a top layer comprising a ceramic material, a bottom layer comprising the ceramic material, at least one protrusion which offsets the top layer from the bottom layer such that an air gap is located between the top layer and the bottom layer, and glass or glass ceramic seals which connect the top layer to the bottom layer.

According to another embodiment a method of forming a dielectric separator comprises forming an assembly comprising a middle layer comprising a dielectric material, a top layer comprising a green ceramic material, a bottom layer comprising the green ceramic material, and a glass or glass ceramic seal material disposed between the middle layer and each of the top and bottom layers, sintering the assembly to densify the top and bottom layers and reflow the glass or glass ceramic seal material, and cutting the sintered assembly to form the dielectric separator.

DETAILED DESCRIPTION

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
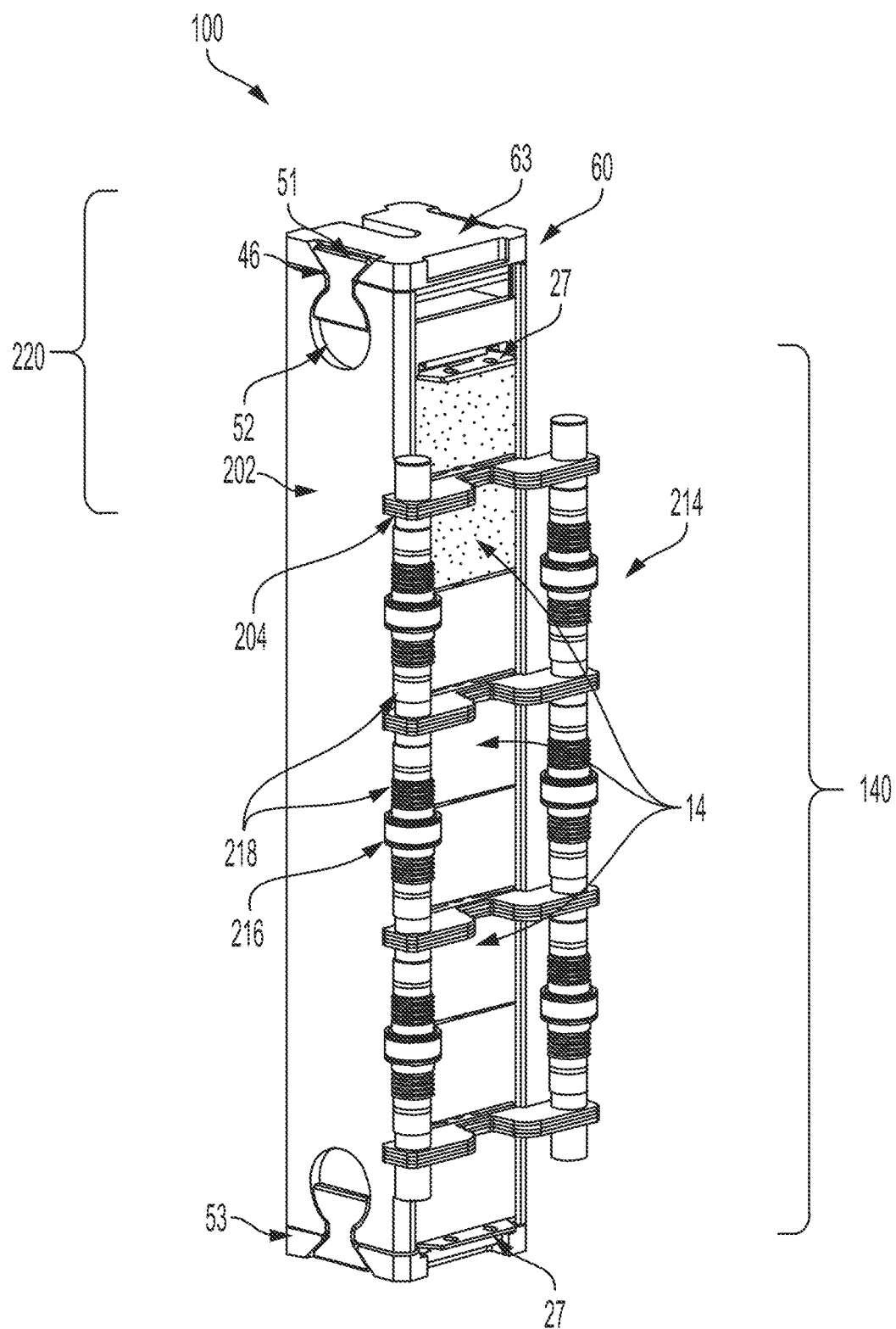
FIG. 1 is a three dimensional view of a prior art fuel cell stack assembly.

FIG. 1 illustrates a fuel cell stack assembly 100 according to various embodiments of the present disclosure. Referring to FIG. 1, the fuel cell stack assembly 100 includes a fuel cell stack column 140, side baffles 220 disposed on opposing sides of the column 140, a lower block 53, and a compression assembly 60 including an upper block 63. The column includes eight fuel cell stacks 14, fuel manifolds 204 disposed between the fuel cell stacks 14, and termination plates 27 disposed on opposing ends of the column 140. The fuel cell stacks 14 include a plurality of fuel cells stacked upon one another and separated by interconnects. A plurality of the fuel cell stack assemblies 100 may be attached to a base.

An exemplary fuel manifold 204 is described in the U.S. application Ser. No. 11/656,563, hereby incorporated by reference in its entirety. Any number of fuel manifolds 204 may be provided between adjacent end plates of adjacent fuel cells of the fuel cell stacks 14, as desired.

The side baffles 220 connect the upper block 63 of the compression assembly 60 and the lower block 53. The side baffles 220, the compression assembly 60, and the lower block 53 may be collectively referred to as a "stack housing". The stack housing is configured to apply a compressive load to the column 140. The configuration of the stack housing eliminates costly feed-throughs and resulting tie rod heat sinks and uses the same part (i.e., side baffle 220) for two purposes: to place the load on the stacks 14 and to direct the cathode feed flow stream (e.g., for a ring shaped arrangement of stacks, the cathode inlet stream, such as air or another oxidizer may be provided from a manifold outside the ring shaped arrangement through the stacks and the exit as a cathode exhaust stream to a manifold located inside the ring shaped arrangement). The side baffles 220 may also electrically isolate the fuel cell stacks 14 from metal components in the system. The load on the column 140 may be provided by the compression assembly 60, which is held in place by the side baffles 220 and the lower block 53. In other words, the compression assembly 60 may bias the stacks 14 of the column 140 towards the lower block 53.

The side baffles 220 may be plate-shaped rather than wedge-shaped and include baffle plates 202 and ceramic inserts 46 configured to connect the baffle plates 202 to the lower block 53 and the compression assembly 60. In particular, the baffle plates 202 include generally circular cutouts 52 in which the inserts 46 are disposed. The inserts 46 do not completely fill the cutouts 52. The inserts 46 are generally bowtie-shaped, but include flat edges 51 rather than fully rounded edges. Thus, an empty space remains in the respective cutouts 52 above or below the inserts 46.

Generally, the side baffles 220 are made from a high-temperature tolerant material, such as alumina or other suitable ceramic. In various embodiments, the side baffles 220 are made from a ceramic matrix composite (CMC). The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. The lower block 53 and the compression assembly 60 may also be made of the same or similar materials. The selection of particular materials for the compression housing is discussed in detail, below.

Any combination of the matrix and fibers may be used. Additionally, the fibers may be coated with an interfacial layer designed to improve the fatigue properties of the CMC. If desired, the CMC baffles may be made from a unitary piece of CMC material rather than from individual interlocking baffle plates. The CMC material may increase the baffle strength and creep resistance. If the baffles are made from alumina or an alumina fiber/alumina matrix CMC, then this material is a relatively good thermal conductor at typical SOFC operating temperatures (e.g., above 700° C.). If thermal decoupling of neighboring stacks or columns is desired, then the baffles can be made of a thermally insulating ceramic or CMC material.

Other elements of the compression housing, such as the lower block 53 and the compression assembly 60 may also be made of the same or similar materials. For example, the lower block 53 may comprise a ceramic material, such as alumina or CMC, which is separately attached (e.g., by the inserts, dovetails or other implements) to the side baffles 220 and to a system base. The use of the ceramic block material minimizes creation of heat sinks and eliminates the problem of linking the ceramic baffles to a metal base, which introduces thermal expansion interface problems. The selection of particular materials for the components of the compression housing is discussed in detail, below.

Fuel rails 214 (e.g. fuel inlet and outlet pipes or conduits) connect to fuel manifolds 204 located between the stacks 14 in the column 140. The fuel rails 214 include ceramic tubes 216 brazed to metal tubes 218. The metal tubes 218 may comprise compressible bellows tubes in one embodiment. The fuel cell rails 214 are used to deliver fuel to each pair of stacks 14 in a column 140 of fuel cell stacks via fuel cell manifolds 204. In these systems, the ceramic tubes 216 are located between adjacent fuel manifolds 204 to prevent shorting between adjacent stacks 14 in a column 140 of stacks 14. The ceramic tubes 216 are relatively expensive and difficult to braze to the metal tubes 218. The ceramic tubes 216 are also prone to cracking due to thermal stresses generated during thermal cycling of the fuel cell system.

Figure 2A:
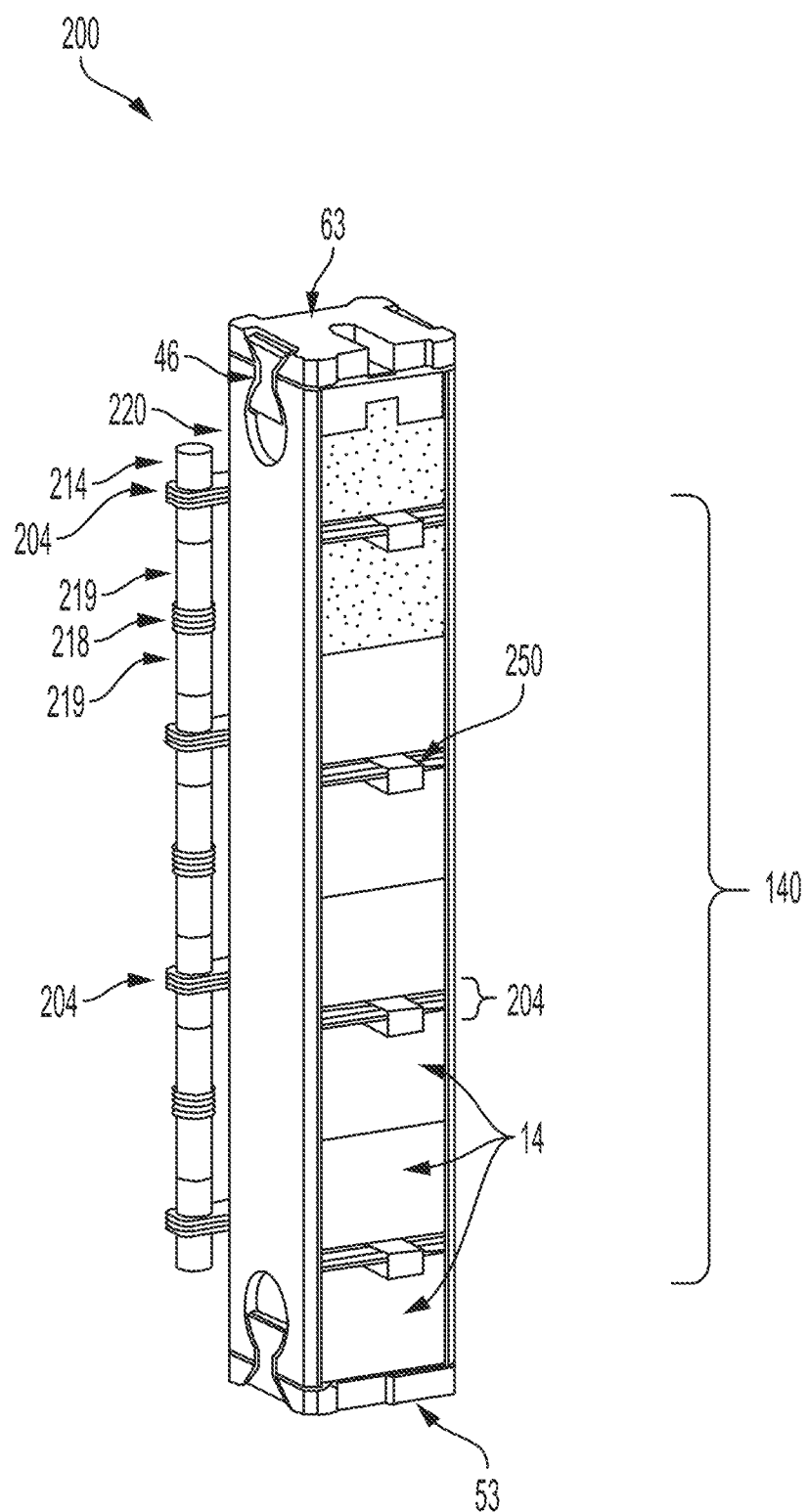
FIG. 2A is a three dimensional view of a fuel cell stack assembly with an electrically isolated fuel manifold, according to various embodiments of the present disclosure.
Figure 2B:
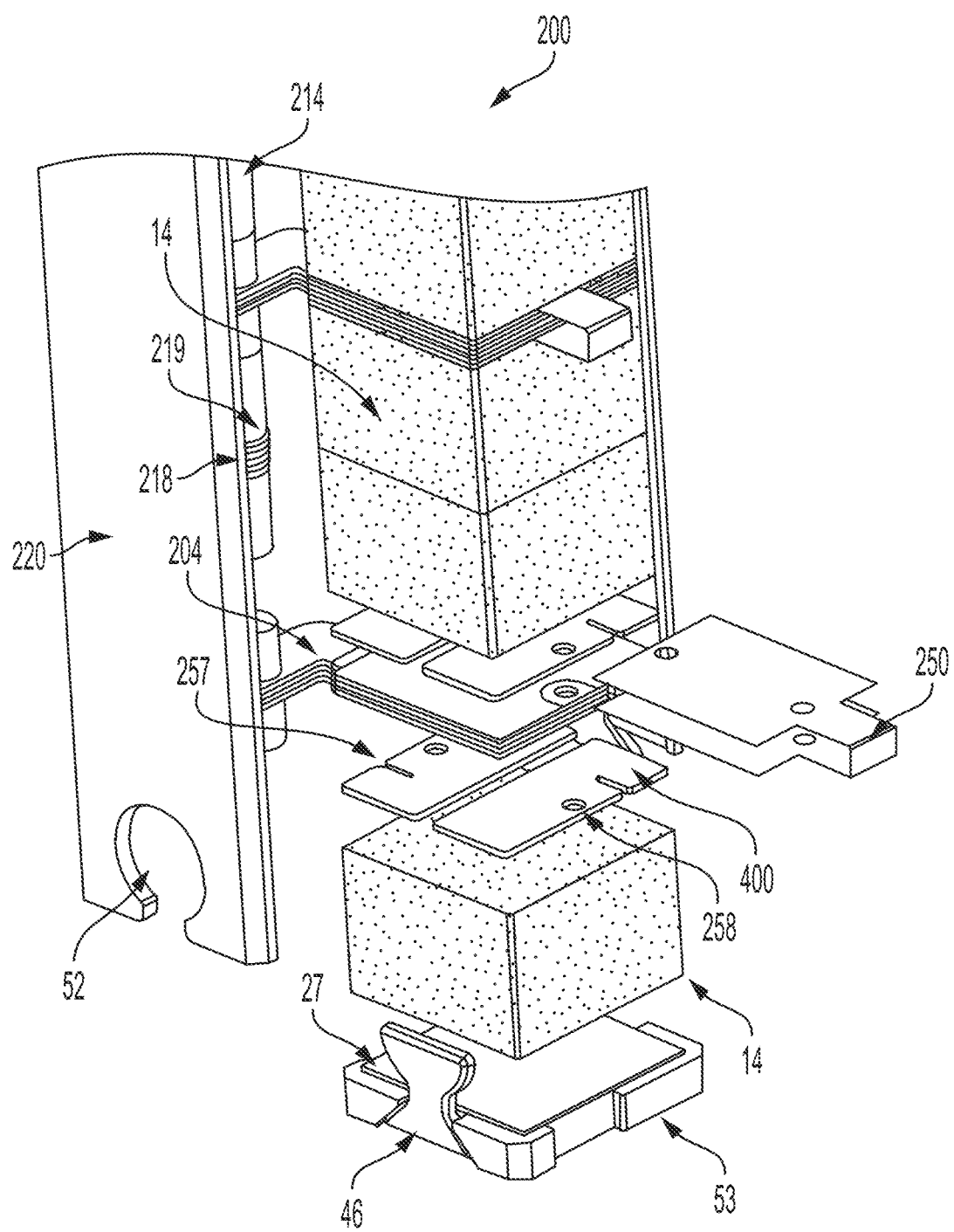
FIG. 2B is a three dimensional exploded view of the fuel cell stack assembly of FIG. 2A.
Figure 3A:
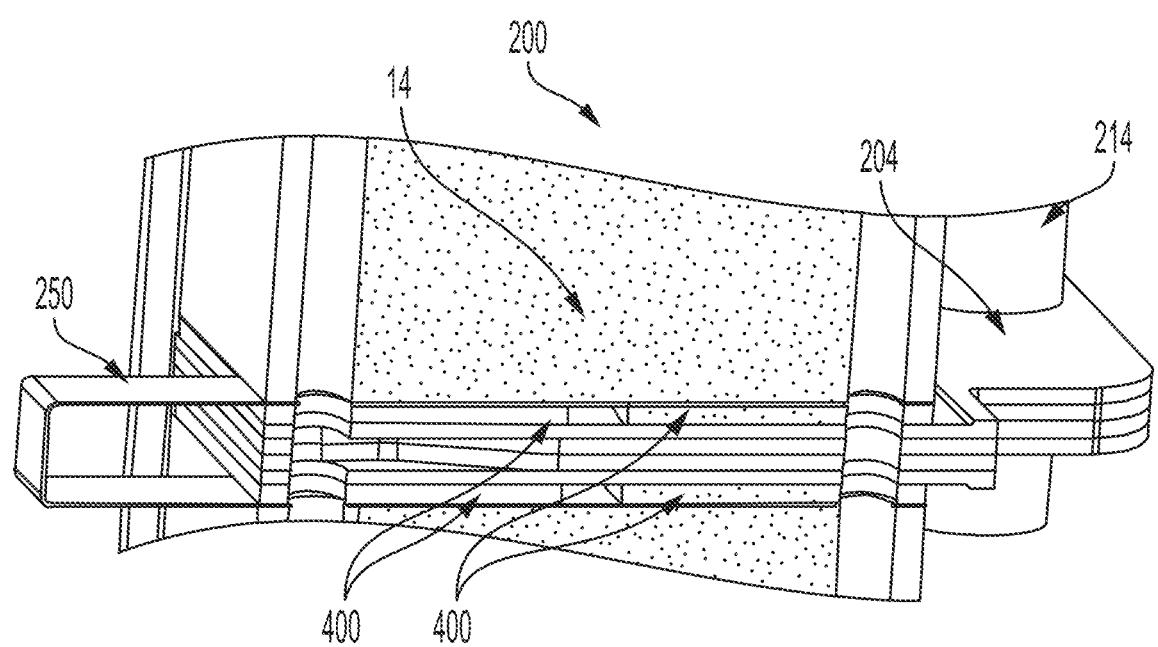
FIG. 3A is a three dimensional close up of a portion of the fuel cell stack assembly of FIG. 2A.
Figure 3B:
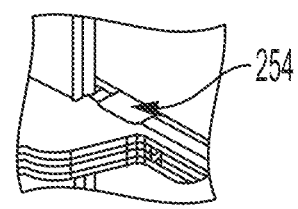
FIG. 3B is a three dimensional close up of another portion of the fuel cell stack assembly of FIG. 2A.

FIG. 2A is a three dimensional view of a fuel cell stack assembly 200 with an electrically isolated fuel manifold, according to various embodiments of the present disclosure, and FIG. 2B is an exploded view of the fuel cell stack assembly 200 illustrated in FIG. 2A. FIG. 3A illustrates a close up of a portion of the fuel cell stack assembly 200 with an electrically isolated fuel manifold illustrated in FIG. 2A. FIG. 3B illustrates a close up of another portion of the fuel cell stack assembly 200 with an electrically isolated fuel manifold 204 illustrated in FIG. 2A.

Referring to FIGS. 2A-3B, rather than braze ceramic and metal tubes the full length of the fuel rails 214 to provide electrical isolation between pairs of adjacent fuel cell stacks 14 separated by a fuel manifold 204, a dielectric separator 400 is provided between the fuel manifolds 204 and the adjacent fuel cell stacks 14. The dielectric separator 400 may comprise any suitable electrically insulating material, such as alumina, a ceramic matrix composite, etc. The fuel rails 214 may be made entirely of metal, not requiring dielectric (e.g., ceramic) tubes 216 which may be omitted. In one embodiment, the fuel rails 214 comprise only the metal bellows 218 and straight metal tubes 219.

A jumper 250 may be provided to allow current to flow from a first fuel cell stack 14 to an adjacent second fuel cell stack 14 which is spaced from the first stack 14 by the fuel manifold 204 in a fuel cell stack column 140 without current flowing though the fuel manifold 204. The jumper 250 may be placed in electrical contact with the first and second the fuel cell stacks 14 around the fuel manifold 204 and dielectric separator 400. The jumper 250 can be made of any suitable conductor, e.g., metals or metal alloys such as Inconel 718 (or other Inconel alloys) or Cr—Fe 5 wt. % alloy, and may have a coefficient of thermal expansion close to that of the stacks 14 and the dielectric separator 400 to make sealing the various components easy. The jumper 250 may generally have a "C" shape in which the top and bottom portions electrically contact the respective adjacent first and second stacks 14 while the side of the jumper 250 which connects the top and bottom portions goes around the fuel manifold 204 and does not contact the fuel manifold 204. In an embodiment, the inner surfaces of the jumper 250 facing the manifold 204 may be coated with a dielectric material instead of or in addition to the dielectric separator 400 or the coating of dielectric separator 400 on the surface of the fuel manifold 204.

As illustrated in FIG. 2B, the dielectric separator 400 is provided with fuel holes 258 which allow the fuel from the fuel manifolds 204 to flow to the fuel cell stacks 14. A seal may be formed around the fuel holes 258, such as a glass seal or any suitable gasket. In an embodiment, other features such as thermocouple slots 257 are provided in the dielectric separator 400 to permit a thermocouple to pass through the slots 257. In an embodiment illustrated in FIG. 3B, tabs 254 which may be used to attach module voltage wires are provided in the jumper 250.

Dielectric Separators

Figure 4A:
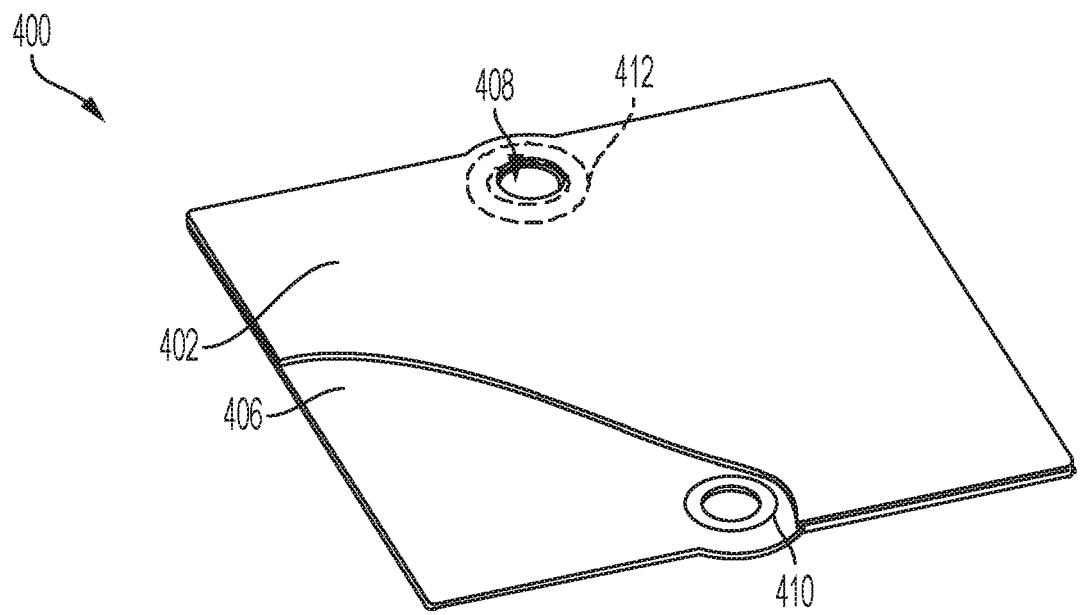
FIG. 4A is a partial perspective view of a dielectric separator, according to various embodiments of the present disclosure.
Figure 4B:
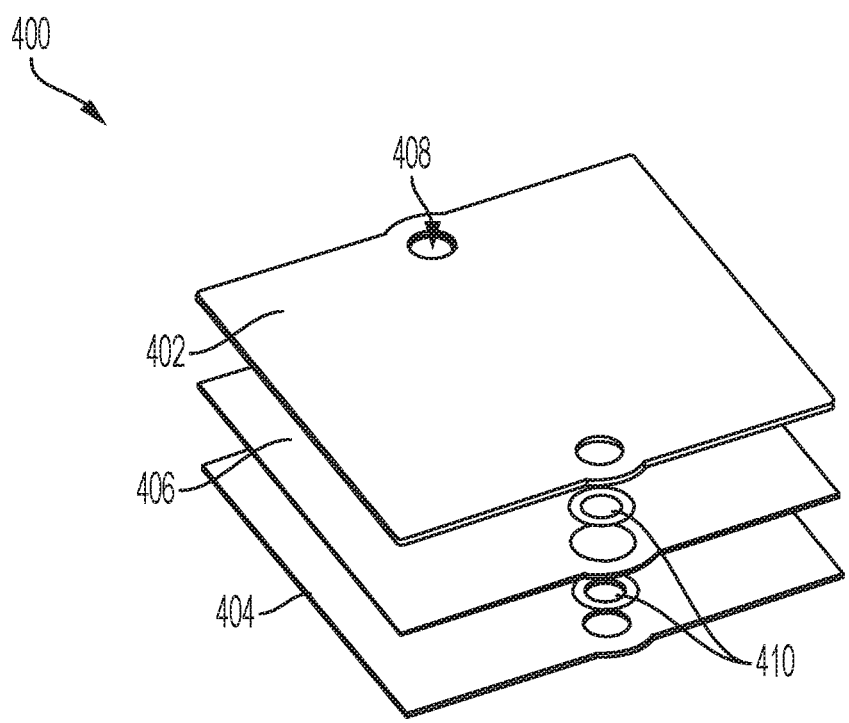
FIG. 4B is an exploded perspective view of the separator of FIG. 4A.

FIG. 4A is a partial perspective view of a dielectric separator 400, according to various embodiments of the present disclosure, and FIG. 4B is an exploded perspective view of the separator 400 of FIG. 4A. Referring to FIGS. 4A and 4B, the separator 400 may be utilized in the fuel cell stack assembly 200 of FIG. 2A.

The separator 400 may include a top layer 402, a bottom layer 404, a middle layer 406, fuel holes 408 and seals 410. The fuel holes 408 may include concentric through holes formed in the top, bottom, and middle layers 402, 404, 406.

The top and bottom layers 402, 404 may be formed of a densified dielectric material. For example, the top and bottom layers 402, 404 may be formed of a substantially non-porous, electrically-insulating, ceramic material, such as alumina, zirconia, yttria stabilized zirconia (YSZ), e.g. 3% yttria stabilized zirconia), or the like. The top and bottom layers 402, 404 may be in the form of rigid plates to provide structural rigidity to the separator 400.

In addition, the top and bottom layers 402, 404 may be substantially impervious to effluent species released from adjacent fuel cells, such as chromia. Accordingly, the top and bottom layers 402, 404 may prevent effluent species from entering the middle layer 406 and reducing the dielectric strength thereof.

The middle layer 406 may be sandwiched between the top and bottom layers 402, 404, and may be formed of a porous and/or high surface area material having a higher dielectric strength than the top and bottom layers 402, 404. In other words, the insulating material of the middle layer may be able to withstand a higher maximum electric field without electrical breakdown and becoming electrically conductive (i.e., have a higher breakdown voltage) than the insulating material of the top and bottom layers 402, 404. The present inventors found that maintaining a high dielectric strength while utilizing only dense ceramic materials may be difficult in a fuel cell system, due to the presence of alkali ions such as Na ions, which may increase the conductivity of such ceramic materials. Accordingly, the middle layer 406 may operate to increase the total dielectric strength of the separator 400.

In some embodiments, the middle layer 406 may be formed of a porous ceramic yarn or fabric that is highly electrically insulating at high temperatures, such as Nextel ceramic fabrics numbers 312, 440 or 610, available from 3M Co. In other embodiments, the middle layer 406 may be formed of a ceramic matrix composite (CMC) layer, or any comparable material that has high dielectric strength, due to having a high surface area to volume ratio. The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. In one embodiment, both matrix and fibers may comprise alumina.

In various embodiments, the seals 410 may be ring seals and may be formed of a high-temperature glass or glass ceramic material, such as a silicate or aluminosilicate glass or glass ceramic material. The seals 410 may operate to connect the top and bottom layers 402, 404 to the middle layer 406, and may hermetically seal the fuel holes 408.

The materials for the individual components of the separator 400 (e.g., the layers 402, 404, 406, and optionally the seals 410) may be selected such that the major constituent of each component is the same. Herein, the major constituent refers to a constituent that is present in the highest amount in a component. For example, in some embodiments, the major constituent of the components 402, 404, and 406, and optionally 410 may be alumina. Having the same major constituent may facilitate bonding of the components 402, 404, 406, 410, and may allow for the sintering of the separator 400 independently from a fuel cell column 200.

In some embodiments, the separator 400 may include additional layers. For example, the separator 400 may include two or more porous ceramic fabric or CMC layers disposed between three or more dense ceramic layers, with the layers being connected by corresponding glass or glass ceramic seals.

In some embodiments, inner surfaces of the top and bottom layers 402, 404 may be provided with a roughened or shag-like texture configured to provide additional air and/or seal material entrapment. The density of portions of the top and bottom layers 402, 404 surrounding the fuel hole 408 may be increased relative to a remainder of the top and bottom layers 402, 404, in order to provide for improved sealing of the fuel holes 408.

In various embodiments, additional glass ring seals 412 may be disposed on top of the top layer 402 and on the bottom of the bottom layer 404, surrounding the fuel holes 408. The additional seals 412 may be used to seal the separator 400 to adjacent fuel cell column components, such as a fuel cell stack or fuel manifold.

Figure 5:
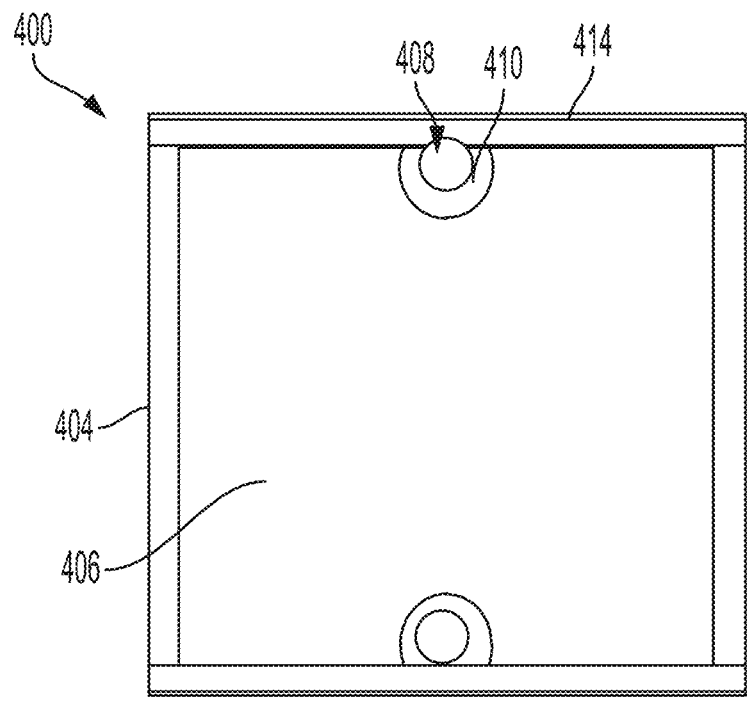
FIG. 5 is a top view of a dielectric separator including edge seals, according to various embodiments of the present disclosure.

FIG. 5 is a top view of the separator 400 including edge seals 414, according to various embodiments of the present disclosure, where the top layer 402 has been omitted for clarity. Referring to FIG. 5, the edge seals 414 may be included in addition to the fuel hole seals 410 and may extend along opposing edges of the separator 400. Accordingly, the edge seals 414 may provide improved adhesion between the layers of the separator 400. The edge seals 414 may be formed by tape casting, dispensing, or dip coating, for example.

Figure 6:
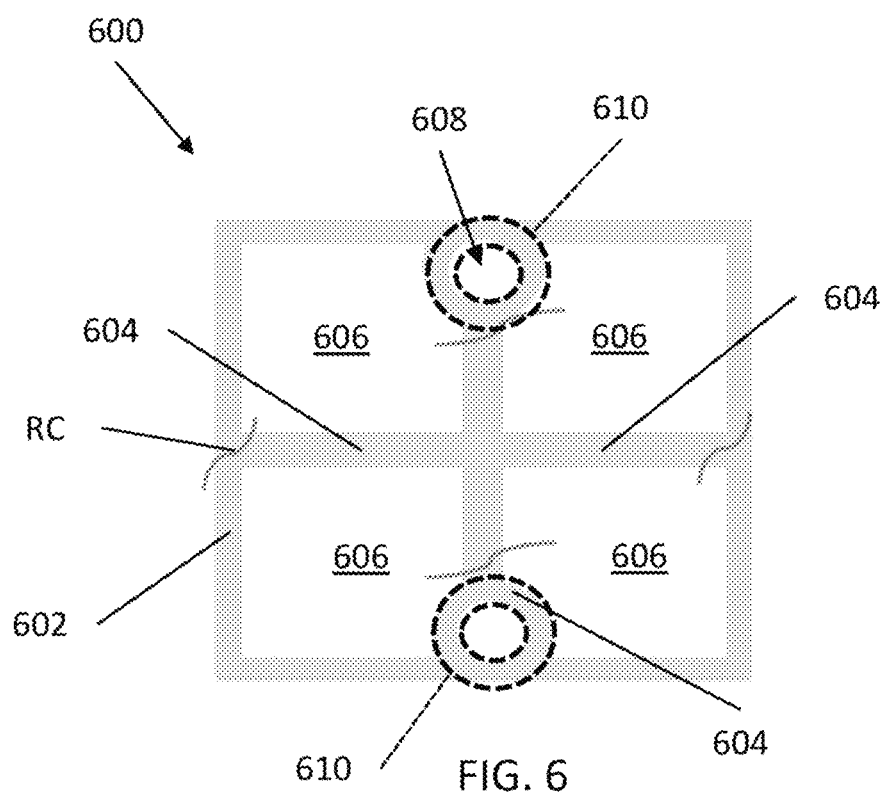
FIG. 6 is a top view of a dielectric separator, according to an alternative embodiment of the present disclosure.

FIG. 6 is a top view of a dielectric separator 600, according to an alternative embodiment of the present disclosure. Referring to FIG. 6, the separator 600 may be formed of a densified ceramic material, such as the high density dielectric material described above with respect to the top and bottom layers 402, 404 of the separator 400. The separator 600 may include a peripheral frame 602 and internal supports 604 disposed inside of the frame 602. The frame 602 and supports 604 may at least partially define internal openings 606 and fuel holes 608. Accordingly the separator 600 may have a uni-body construction, as opposed to a composite layered construction of the separator 400.

Ring seals 610 may be disposed on top and bottom surfaces of the separator 600, surrounding the fuel holes 608. The seals 610 may be formed of the same glass material as described above with respect to the seals 410. The seals 610 may be configured to seal the separator 600 to adjacent fuel cell column components, such as a fuel cell stack and a fuel manifold. The separator 600 may optionally include relief cuts RC where the separator 600 is cut to reduce the effects of thermal expansion and contraction. For example, the relief cuts RC may reduce stress applied to the glass seals 610 due to thermal expansion of adjacent metal parts, and thereby reduce and/or prevent shearing of the glass seals 610 during thermal cycling.

Figure 7A:
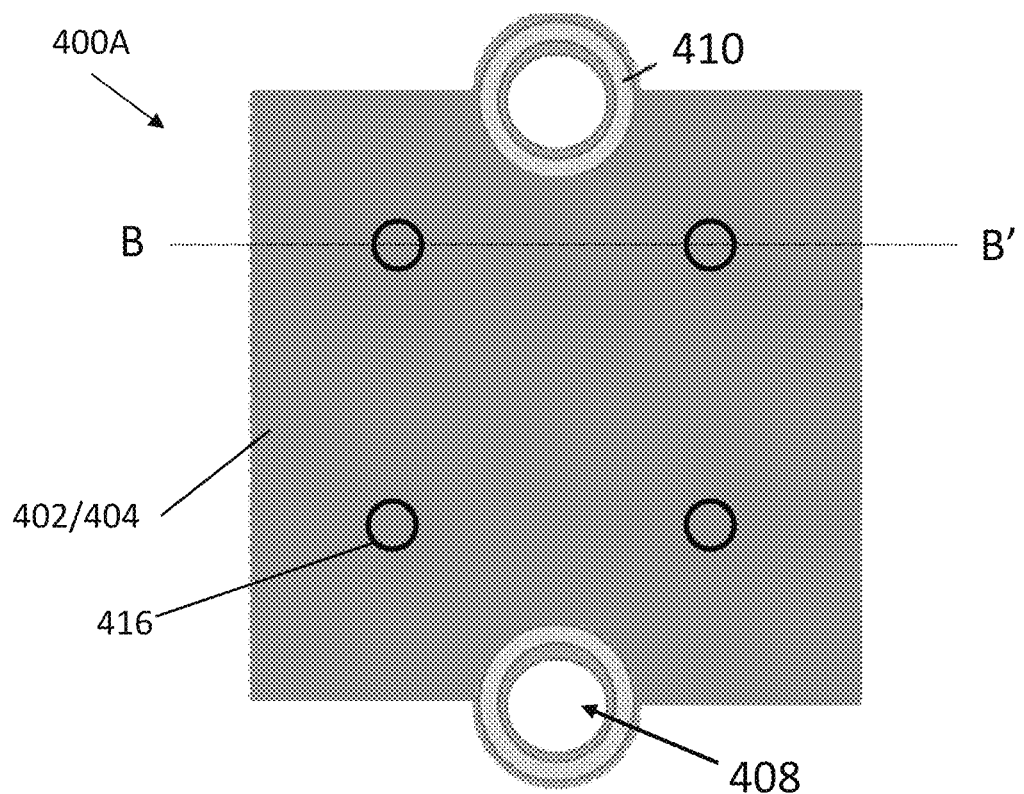
FIG. 7A is a cut-away view of a dielectric separator, according to another alternative embodiment of the present disclosure.
Figure 7B:
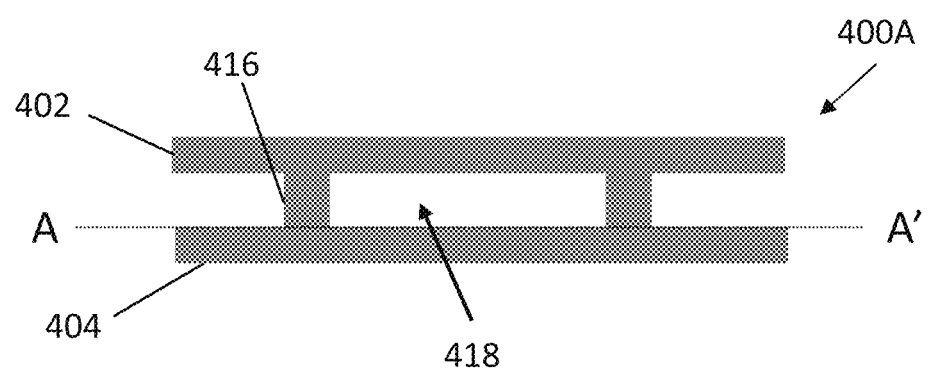
FIG. 7B is a side cross sectional view of the dielectric separator along line B-B' of FIG. 7A. The plane A-A' in FIG. 7B corresponds to the cut-away view plane of FIG. 7A.

FIGS. 7A and 7B illustrate a dielectric separator 400A, according to another alternative embodiment of the present disclosure. In this embodiment, the middle layer 406 is omitted and is replaced by an air gap 418. Air has a higher dielectric breakdown strength than the ceramic materials of the top layer 402 and the bottom layer 404. At least one of the top layer 402 or the bottom layer 404 includes at least one protrusion 416 on the side facing the other one of the top layer 402 or the bottom layer 404. The at least one protrusion 416 offsets the top layer 402 from the bottom layer 404 such that the air gap 418 is located between the top layer 402 and the bottom layer 404. Glass or glass ceramic seals 410 connect the top layer 402 to the bottom layer 404 as shown in FIG. 7A. The seals 410 may have any suitable shape described above.

In one embodiment, at least one protrusion 416 may be located on the bottom side of the top layer 402 facing the top side of the bottom layer 404. The at least one protrusion 416 contacts the top side of the bottom layer 404 such that the air gap 418 is located between the top layer 402 and the bottom layer 404.

In another embodiment, at least one protrusion 416 may be located on the top side of the bottom layer 404 facing the bottom side of the top layer 402. The at least one protrusion 416 contacts the bottom side of the top layer 402 such that the air gap 418 is located between the top layer 402 and the bottom layer 404.

In another embodiment, the protrusions 416 may be located on both the bottom side of the top layer 402 and on the top side of the bottom layer 404. In this embodiment, at least one protrusion 416 on the bottom side of the top layer 402 may contact at least one protrusion 416 on the top side of the bottom layer 404. Alternatively, the protrusions 416 on the top and bottom layers may be offset from each other such that at least one protrusion 416 on the bottom side of the top layer 402 may contact the top side of the bottom layer 404, and at least one additional protrusion 416 on the top side of the bottom layer 404 may contact the bottom side of the top layer 402. The protrusions 416 vertically offset the top and bottom layers from each other to form the air gap 418 located between the top layer 402 and the bottom layer 404.

Any number of protrusions 416 may be located on the top layer 402 and/or the bottom layer 404. For example, as shown in FIG. 7A, four protrusions 416 may be located on the bottom side of the top layer 402 and/or on the top side of the bottom layer 404. However, one, two, three or more than four protrusions 416 may be formed. The protrusions 416 may be formed of the same ceramic material as the ceramic material of the top and bottom layers, such as alumina, zirconia or YSZ. The protrusions 416 may have any suitable horizontal cross sectional shape. For example, the protrusions 416 shown in FIG. 7A comprise filled cylinders having a circular horizontal cross sectional shape. However, other suitable horizontal cross sectional shapes may be used, such polygonal (e.g., triangular, square, rectangular, hexagonal, etc.), oval or irregular shapes. The protrusions 416 may be formed at the same time as the top or bottom layers using any suitable ceramic processing method.

Dielectric Separator Fabrication Methods

Figure 8A:
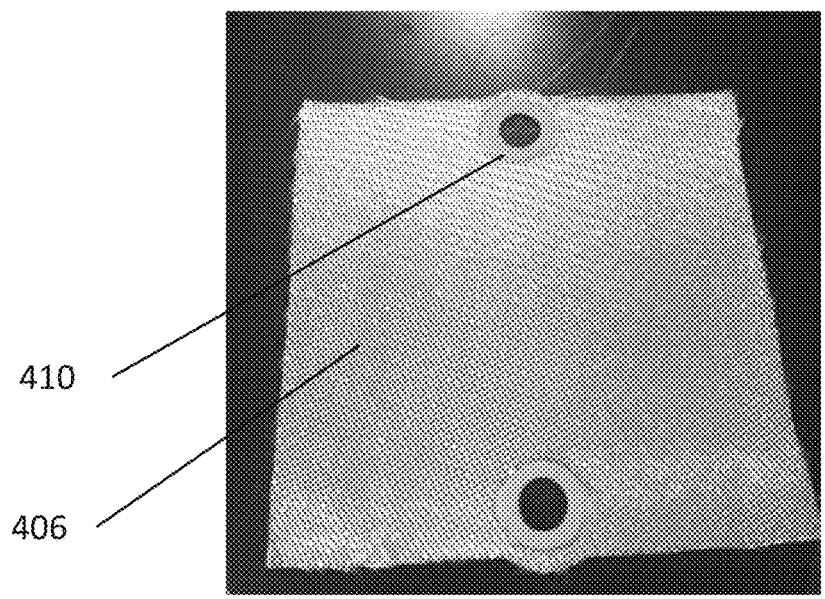
FIG. 8A is a photograph showing dielectric separator seals formed by tape casting.
Figure 8B:
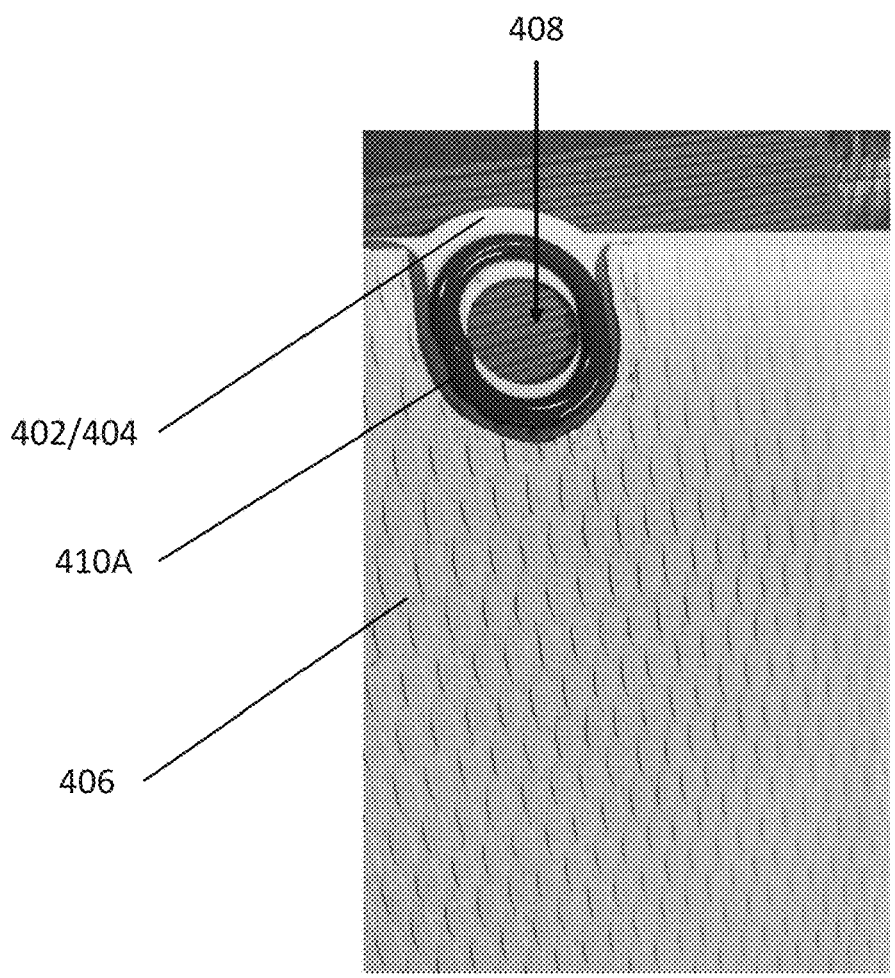
FIG. 8B is a photograph showing seals formed by dispensing a seal material ink, according to various embodiments of the present disclosure.

FIG. 8A is a photograph showing seals of a dielectric separator seal formed by tape casting on a fabric middle layer 406, and FIG. 8B is a photograph showing seals formed by dispensing a seal material ink on a CMC middle layer 406, according to various embodiments of the present disclosure. Referring to FIGS. 4A, 4B, 8A, and 8B, in some embodiments the separator 400 may be formed by applying a seal material to at least one side of the middle layer 406, or to one or both of the top and bottom layers 402, 404, so as to surround the fuel holes 408 and form the seals 410. For example, the seal material may be applied to the middle layer 406 by tape casting, as shown in FIG. 8A. The top and bottom layers 402, 404 may be ceramic plates formed by tape casting a ceramic material. Accordingly, the top and bottom layers 402, 404 may initially be in a green (porous) state.

In the alternative, as shown in FIG. 8B, the middle layer 406 may be disposed on one of the top and bottom layers 402, 404, and a fluid seal material 410A, such as a seal material ink may be dispensed on the bottom layer 404 and/or the middle layer 406 around the fuel hole 408. The seal material ink may include a silicate or aluminosilicate glass or glass ceramic seal material, a solvent, and/or a binder. In other embodiments, the seal material or any suitable sintering aid, may be applied between edges of the top and bottom layers 402, 404, for example by tape casting, dispensing, or dip coating, as shown in FIG. 5.

The layers 402, 404, 406 may then be stacked together to form the separator 400. The separator 400 may then be heated (e.g., sintered) at a temperature above the reflow temperature of the seal material. For example, the separator 400 may be heated at a temperature of at least about 950° C., such as a temperature ranging from about 975° C. to about 1000° C., such that the glass seal flows into the middle layer 406 and/or around the fuel holes 408 and bonds with the surfaces of the top and bottom layers 402, 404. The heating may also sinter the top and bottom layers 402, 404, thereby densifying the top and bottom layers 402, 404. In some embodiments, the separator may be compressed during the sintering process.

In some embodiments, a vacuum may be applied to the separator 400 prior to the sintering. The vacuum may operate to drive the seal material into the middle layer 406 and/or into pores of the top and bottom layers 402, 404, such as pores adjacent to the fuel holes 408. For example the seals 410 may be formed by vacuum casting with or without a liquid sintering aid.

In embodiments where the middle layer 406 is a CMC plate, the separator 400 may be formed by plasma spraying a ceramic powder onto opposing sides of the middle layer 406, to form the top and bottom layers 402, 404. The seal material may be applied to the middle layer 406, before or after the plasma spraying. The separator 400 may then be heated to densify the ceramic powder and bond the top and bottom layers 402, 404 to the middle layer 406. The heating may also include reflowing the seal material.

Figure 9:
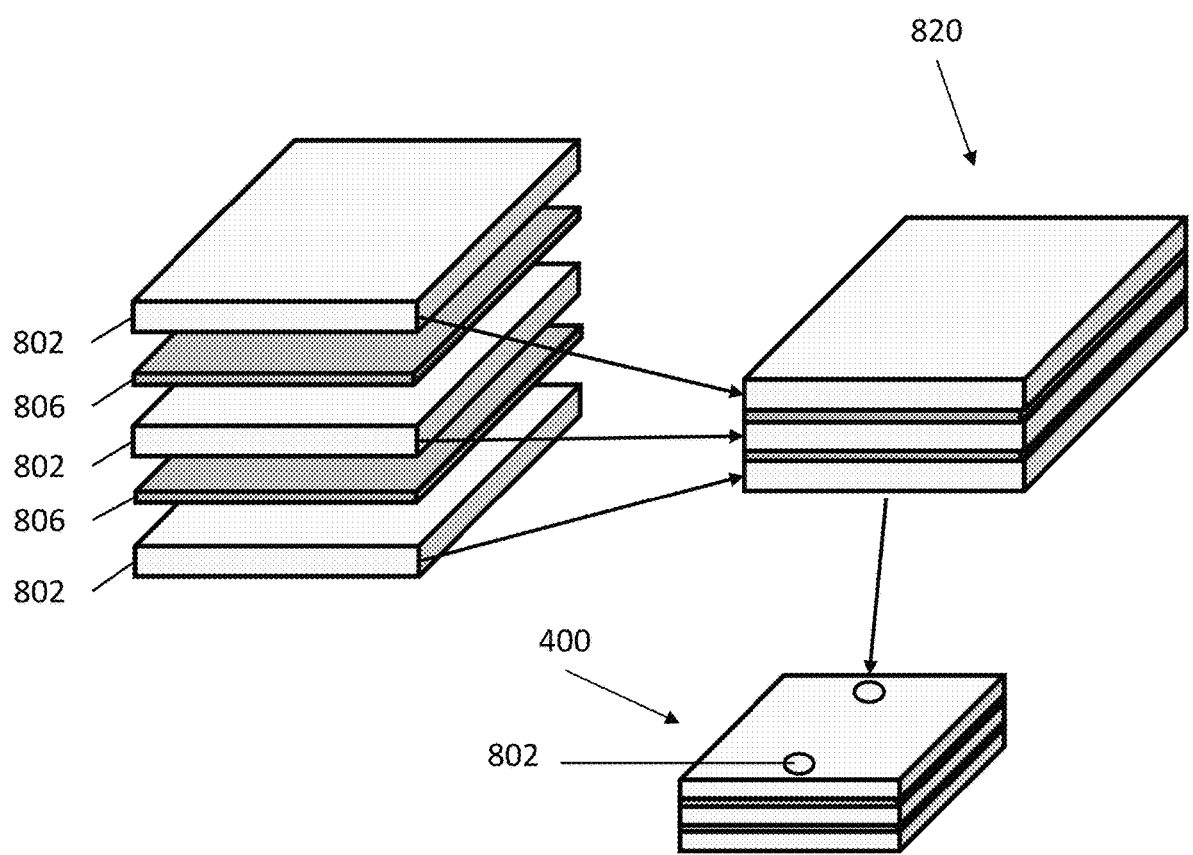
FIG. 9 is a perspective view depicting a method of manufacturing of a dielectric separator, according to various embodiments of the present disclosure.

FIG. 9 is a perspective view depicting a method of manufacturing of a dielectric separator 800, according to various embodiments of the present disclosure. Referring to FIG. 9, a glass seal material may be applied to two or more ceramic plates 802, which may be in a green state, and/or may be applied to one or more the porous dielectric layers 806, such as CMC layers or ceramic fiber layers.

For example, in some embodiments, the seal material may be applied to specific locations corresponding to fuel holes and/or edge regions of subsequently formed separators, as discussed below. The ceramic plates 802 may be formed by, for example, tape casting a ceramic material, such as alumina, zirconia, yttria-stabilized zirconia, or the like.

The dielectric layers 806 may then be stacked between the ceramic plates 802, to form a laminated assembly 820. The assembly 820 may be sintered at a temperature sufficient to densify the ceramic plates 802 and reflow the seal material, such as a temperature ranging from about 950 to about 1000° C. As a result, the seal material may physically connect the layers of the assembly 820. In some embodiments, a vacuum may be applied to the assembly 820 before and/or during sintering, in order to facilitate impregnation of the seal material into the dielectric layers 806.

The sintered assembly 820 then may be cut and/or shaped to form individual dielectric separators 800. For example, the assembly 820 may be cut to form a peripheral shape of the separators 400 and to form fuel holes 408 therein.

While three ceramic plates 802 and two porous dielectric layers 802 are shown in FIG. 9, the present disclosure is not limited thereto. For example, two ceramic plates 802 and one porous dielectric layer 806 may be used to form the assembly 820, or the assembly 820 may include four or more ceramic plates 802 and three or more porous dielectric layers 806.

In an alternative embodiment, the ceramic plates 802 may be formed by spraying a ceramic material onto opposing sides of a dielectric layer 806 and form an assembly. For example, the ceramic material may be plasma sprayed onto the dielectric layer 806. The assembly may be sintered to densify the ceramic material and form ceramic plates 802. The sintered assembly may optionally be cut to form individual separators 800.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell column comprising:
   first and second fuel cell stacks;
   a fuel manifold disposed between the first and second fuel cell stacks and configured to provide fuel to the first and second fuel cell stacks; and
   first and second dielectric separators located between the fuel manifold and the respective first and second fuel cell stacks, and configured to electrically isolate the respective first and second fuel cell stacks from the fuel manifold, the first and second dielectric separators each comprising:
   a top layer comprising a ceramic material;
   a bottom layer comprising the ceramic material;
   a middle layer disposed between the top and bottom layers and comprising a material having a lower density and a higher dielectric strength than the ceramic material; and
   glass or glass ceramic seals which connect the middle layer to the top and bottom layers.

2. The fuel cell column of claim 1, further comprising fuel holes formed in opposing sides of each of the first and the second dielectric separators and comprising concentric through holes formed in the top, middle, and bottom layers of each of the first and the second dielectric separators, wherein the seals comprise ring seals disposed on top and bottom surfaces of the middle layer and surrounding the fuel holes in each of the first and the second dielectric separators.

3. The fuel cell column of claim 2, further comprising edge seals extending along opposing edges of the top and bottom surfaces of the middle layer and comprising a glass material.

4. The fuel cell column of claim 1, wherein the middle layer comprises a ceramic fabric.

5. The fuel cell column of claim 1, wherein the middle layer comprises a ceramic matrix composite.

6. The fuel cell column of claim 1, wherein:
   a surface area to volume ratio of the middle layer is greater than a surface area to volume ratio of the top and bottom layers; and
   the ceramic material comprises alumina, zirconia, or yttria stabilized zirconia (YSZ).

7. The fuel cell column of claim 1, wherein a major constituent of the top, middle, and bottom layers is the same.

8. The fuel cell column of claim 7, wherein the major constituent is alumina or zirconia.

9. The fuel cell column of claim 2, wherein each of the first and the second dielectric separator further comprises:
- a first additional layer of the ceramic fabric or ceramic matrix composite material disposed on top of the top layer;
- a second additional layer of the ceramic material disposed on top of the first additional layer; and
- additional ring seals disposed on top and bottom surfaces of the first additional layer, surrounding through holes of the first additional layer, and comprising a glass or glass ceramic material.

10. The fuel cell column of claim 1, further comprising an electrically conductive jumper bypassing the fuel manifold and the first and the second dielectric separators, the electrically conductive jumper configured to conduct electricity between the first and second fuel cell stacks.

11. The fuel cell column of claim 2, wherein the fuel holes are fluidly connected to fuel holes of the fuel manifold and fuel holes of the first and second fuel cell stacks.

12. The fuel cell column of claim 1, further comprising electrically conductive fuel rails connecting the fuel manifold to an adjacent fuel manifold in the fuel cell column.

13. The fuel cell column of claim 12, wherein the electrically conductive fuel rails comprise metal or metal alloy bellows tubes connected to straight metal or metal alloy tubes.

14. A fuel cell column comprising:
- first and second fuel cell stacks;
- a fuel manifold disposed between the first and second fuel cell stacks and configured to provide fuel to the first and second fuel cell stacks; and
- first and second dielectric separators located between the fuel manifold and the respective first and second fuel cell stacks, and configured to electrically isolate the respective first and second fuel cell stacks from the fuel manifold, the first and second dielectric separators each comprising:
- a peripheral frame;
- internal supports disposed inside of the frame and configured to support the peripheral frame; and
- fuel holes and internal openings at least partially defined by the peripheral frame and internal supports.

15. The fuel cell column of claim 14, wherein the separators each comprise relief cuts formed in at least one of the frame or the internal supports.

16. A fuel cell column comprising:
- first and second fuel cell stacks;
- a fuel manifold disposed between the first and second fuel cell stacks and configured to provide fuel to the first and second fuel cell stacks; and
- first and second dielectric separators located between the fuel manifold and the respective first and second fuel cell stacks, and configured to electrically isolate the respective first and second fuel cell stacks from the fuel manifold, the first and second dielectric separators each comprising:
- a top layer comprising a ceramic material;
- a bottom layer comprising the ceramic material;
- at least one protrusion which offsets the top layer from the bottom layer such that an air gap is located between the top layer and the bottom layer; and
- glass or glass ceramic seals which connect the top layer to the bottom layer.

17. A method of forming a dielectric separator, the method comprising:
- forming an assembly comprising a middle layer comprising a dielectric material, a top layer comprising a green ceramic material, a bottom layer comprising the green ceramic material, and a glass or glass ceramic seal material disposed between the middle layer and each of the top and bottom layers;
- sintering the assembly to densify the top and bottom layers and reflow the glass or glass ceramic seal material; and
- cutting the sintered assembly to form the dielectric separator.

18. The method of claim 17, further comprising placing the dielectric separator into a fuel cell column between a fuel manifold and a fuel cell stack.

19. The method of claim 17, wherein a major constituent of the top, middle, and bottom layers is the same.

20. The method of claim 19, wherein the middle layer comprises a ceramic fabric or a ceramic matrix composite.

* * * * *